United States Patent [19]
Bezos

[11] Patent Number: 5,986,577
[45] Date of Patent: Nov. 16, 1999

[54] METHOD OF DETERMINING CAR POSITION

[75] Inventor: Angel P. Bezos, Rockwood, Md.

[73] Assignee: Westinghouse Air Brake Company, Wilmerding, Pa.

[21] Appl. No.: 08/653,153

[22] Filed: May 24, 1996

[51] Int. Cl.[6] .................................. G08G 1/01; B61L 3/00
[52] U.S. Cl. ............... 340/933; 340/825.05; 340/825.06; 340/531; 340/310.01; 246/1 C; 246/6; 246/122 R; 246/167 R; 104/88.03; 701/19
[58] Field of Search ...................................... 340/933, 531, 340/825.05, 825.13, 425.5, 825.06, 310.01; 246/1 C, 2 E, 2 R, 3–6, 122 R, 124, 166.1, 167 R; 104/88.02, 88.03, 88.04, 88.05, 88.06, 297; 370/252, 909; 701/19

[56] References Cited

U.S. PATENT DOCUMENTS

| | | | |
|---|---|---|---|
| 3,721,820 | 3/1973 | Caulier et al. | 246/247 |
| 4,041,470 | 8/1977 | Slane et al. | 340/505 |
| 4,689,602 | 8/1987 | Morihara et al. | 340/536 |
| 4,702,291 | 10/1987 | Engle | 105/35 |
| 4,825,189 | 4/1989 | Honma et al. | 246/166.1 |
| 5,168,273 | 12/1992 | Solomon | 340/870.05 |
| 5,651,517 | 7/1997 | Stevens et al. | 246/2 R |

Primary Examiner—Donnie L. Crosland
Attorney, Agent, or Firm—James Ray & Associates

[57] ABSTRACT

A system and method for determining the position of each railroad vehicle within a train consist. The train consist includes a locomotive, at least one trainline and at least one railroad vehicle. The locomotive has a computer. The at least one trainline has a power line for supplying power to the computer and to each railroad vehicle. The system includes the computer as programmed, a vehicle computing device incorporated into each railroad vehicle, and the at least one trainline interconnecting the computer with each vehicle computing device. Each vehicle computing device contains a unique identification code. Each vehicle computing device can apply to and sense from the power line an electrical signal. The computer via the program commands sequentially each vehicle computing device, via the identification codes, to so apply the electrical signal. Each time the computer so commands one of the vehicle computing devices, all of the other vehicle computing devices located between the locomotive and the vehicle computing device which applied the electrical signal sense the electrical signal. All of the other vehicle computing devices that sensed the electrical signal then respond to the computer, via the at least one trainline, that the electrical signal was sensed. The computer, after having commanded all of the vehicle computing devices and having received the responses therefrom, automatically determines the position of each railroad vehicle relative to all other railroad vehicles within the train consist.

20 Claims, 3 Drawing Sheets

METHOD OF DETERMINING CAR POSITION

FIELD OF THE INVENTION

The present invention generally relates to a procedure for determining the position of railroad cars within a train consist and, more particularly, is concerned with a system and a method for automatically determining the position of railroad cars within a train consist without the need for intervention by a train operator.

BACKGROUND OF THE INVENTION

Since the advent of solid state electronics, manufacturers of railroad transportation technology have sought to convert locomotive control systems from conventional mechanical apparatus to more modern electronic componentry. Part of the rationale for preferring electronic systems over their mechanical counterparts involves factors that one typically associates with computerization. Faster control of critical systems and elimination of bulky mechanical hardware to decrease weight and increase available space are two such factors. Reliability and greater operational efficiency are prime examples of two other such factors. Market forces including the need to keep up with business competitors are also important factors for companies engaged in the development of such computerized locomotive control systems.

Electronic locomotive control systems of varying sophistication and complexity have been developed in recent years. The electronics within these control systems perform the basic functions requisite to the control of a locomotive more efficiently than the old mechanical relay based systems of years past. Computerized locomotive control systems now control engine propulsion, dynamic braking and pneumatic braking to name a few such functions. These electronic control systems may also be interconnected with other systems such as wheel slip and slide detection circuitry. Such features further enhance the performance of railroad locomotives and make such computerized systems even more attractive to customers of railroad equipment manufacturers.

These advances in railroad transportation technology have served to accelerate further the drive toward gleaning more and more utility from such computer controlled systems. The customers of railroad equipment manufacturers such as freight and passenger transit services expect electronic locomotive control systems that perform an ever increasing number of tasks and that do so automatically. Customers often specifically request that certain functions, previously performed manually, be automated by either modifying existing computer systems or employing new function specific electronic hardware or a combination of both. Automatically determining position of a rail vehicle within a train consist is one such function that may be implemented using either entirely new equipment or a combination of new and existing equipment via the present system and method.

A train consist routinely stops frequently to add and remove railroad cars so as to pick-up and deliver various goods for shipment. A train operator therefore has to maneuver the train consist alongside siding railroad tracks to allow coupling and uncoupling of railroad cars as other railroad cars are added and removed. Quite often the train operator also has to position particular railroad cars adjacent railside platforms to allow loading or unloading of goods intended for shipment on specially equipped railroad cars. For train consists of moderate to long length, especially freight trains which often extend a mile or more in length, it proves quite a tedious and time consuming task to determine the exact location of a particular railroad car within the train consist.

The present invention, however, automatically and quickly informs the train operator of the exact order of vehicles within the train consist. The present system saves time and labor that otherwise would be expended in pinpointing the position of a particular railroad car using other more time consuming ways of ascertaining railroad car position. The present system also eliminates the possibility of error in determining railroad car position as compared to using a human to determine same. Though perhaps a luxury on train consists of very short length, on moderate to long train consists, especially those long freight trains, the present system constitutes an advance over previous practice.

The present system and method may be realized in part by taking advantage of certain components commonly found on today's more modern train consists. A typical train consist includes at least one locomotive, one or more rail vehicles and a plurality of trainlines. The trainlines include both pneumatic and electrical lines generally running from a head of train locomotive to a last rail vehicle in the train and connecting to air brakes and electrical devices, respectively, in each rail vehicle situated therebetween. Specifically, in a locomotive, the pneumatic trainlines include an actuating pipe, a main reservoir equalizing (MER) pipe, and an independent application and release (IAR) pipe. Within a locomotive consist (i.e., two or more locomotives interconnected to haul heavy loads), each of the MER, actuating and IAR pipes respectively interconnect with the MER, actuating and IAR pipes of the other locomotives. The pneumatic trainlines also include a brake pipe. The brake pipe consists of a series of pipe lengths one of which secured to the underside of each rail vehicle and interconnected to another such pipe length via a flexible coupler situated between each rail vehicle. The brake pipe is thus one long continuous pipe running from the head of train locomotive to the last rail vehicle.

Sometimes referred to in the singular as a trainline or a trainline cable, the electrical trainlines (i.e., wires) include a power line and a return line which, along with other electrical lines, are contained within a protective conduit or cable. As with the brake pipe, the electrical trainlines actually constitute a series of individual conduits one of which usually secured to the underside of each rail vehicle and interconnected via a connector situated between each rail vehicle. The power line supplies power from the head of train locomotive to each of the railroad vehicles within the train consist. The return line likewise supplies a path for completing electrical circuits supplied by the power line. For the sake of clarity, the reader is advised that hereinafter all references to the term "trainline" denote "electrical trainline" and not "pneumatic trainline" unless otherwise specifically noted.

The head of train locomotive is typically equipped with one or more computerized systems, a cab keyboard for accessing at least one of such preexisting computerized systems, and a cab display for monitoring train operation. One example of such preexisting computerized systems is the EPIC® Computer Controlled Brake Equipment Produced by the Westinghouse Air Brake Company (WABCO). The EPIC® Brake Control Equipment controls the operation of the brakes for all the railroad vehicles within a train consist. Another example of such preexisting computerized systems is the Cab Integration Equipment in the locomotive which, simply stated, controls the overall operation of a train consist.

The present system and method may be implemented using either componentry dedicated solely to the present invention or a combination of new and existing equipment such as the locomotive computer and the trainlines alluded to above. The latter alternative is a preferred means for carrying out the present invention, though the former alternative is equally efficacious. This will become apparent from the following detailed description and claims.

SUMMARY OF THE INVENTION

In a presently preferred embodiment, the present invention provides a system for determining position of a railroad car within a train consist. The train consist includes a locomotive, at least one trainline and at least one railroad car. The locomotive has a computer means for controlling operation of the locomotive and the trainline has a power line for supplying power to the computer means and to each of the vehicles within the train consist. The system includes: the computer means operating according to a programming means; a vehicle computing means, incorporated within each railroad car, to which is assigned a unique identification code; and at least one of the trainlines interconnecting the computer means with each of the vehicle computing means. The vehicle computing means is used to apply an electrical signal to the power line and to sense the electrical signal applied to the power line by another one of the vehicle computing means. Using the identification codes, the computer means is used to command sequentially each of the vehicle computing means to apply the electrical signal to the power line. Each time the computer means so commands one of the vehicle computing means, each of all the other vehicle computing means located between the locomotive and the vehicle computing means that applied the electrical signal senses the electrical signal. Those other vehicle computing means located between the locomotive and that railroad car then each respond to the computer means, via at least one of the trainlines, with an indication that the electrical signal was sensed. In this manner, the computer means learns the position of the railroad car containing the vehicle computing means that so applied the electrical signal relative to those containing the vehicle computing means that responded to the electrical signal. The computer means, after having commanded all of the vehicle computing means and having received the responses therefrom, automatically determines the position of each railroad car relative to the positions of all the other railroad cars within the train consist.

The present invention further provides a method for determining position of a railroad car within a train consist. The train consist includes a locomotive, at least one trainline and at least one railroad car. The locomotive has a computer means for controlling operation of the locomotive and the trainline has a power line for supplying power to the computer means and to each of the vehicles within the train consist. Each vehicle within the train consist has a vehicle computing circuit that contains a unique identification code. The method includes the steps of supplying the computer means with all of the identification codes assigned to the vehicle computing circuits via at least one trainline; and commanding sequentially, through the computer means, each vehicle computing circuit, via its assigned identification code, to apply an electrical signal to such power line wherein the electrical signal is recognizable by all of the vehicle computing circuits. The method also includes the step of sensing the electrical signal and responding to the computer means with an indication that the electrical signal was sensed. Specifically, after each vehicle computing circuit has applied the electrical signal to the power line, for all other vehicle computing circuits located between the locomotive and the vehicle computing circuit which applied the electrical signal, the electrical signal is sensed. For those other vehicle computing circuits so located, the computer means, via at least one trainline, receives a response indicating that the electrical signal was sensed. The railroad car locating method additionally includes the step of repeating, in order, the commanding step and the sensing and responding step until all the vehicle computing circuits have applied the electrical signal to such power line and responded appropriately to the computer means. The method next includes the step of determining automatically via the computer means, after the computer means has so commanded all of the vehicle computing circuits and has received the responses therefrom, the position of each railroad car relative to the positions of all other railroad cars within the train consist.

OBJECTIVES OF THE INVENTION

It is, therefore, a primary objective of the present invention to provide a system and method for automatically determining the position of vehicles within a train consist without the need for intervention by a train operator.

Another objective of the present invention is to provide a system and method for automatically determining the position of vehicles within a train consist wherein a locomotive computer using unique identification codes, one of which is contained within a vehicle computing device incorporated into each such vehicle, establishes the position of all such vehicles within such train consist.

Yet another objective of the present invention is to provide a system and method for automatically determining the position of vehicles within a train consist wherein a locomotive computer, interconnected to a vehicle computing device incorporated into each such vehicle, establishes automatically or at the direction of a train operator the position of all such vehicles within such train consist even though either the order of such vehicles within such train consist may have been changed or other vehicles may have been added to or removed from such train consist or both.

Still another objective of the present invention is to provide, on a train consist having a locomotive computer and a plurality of trainlines, a system and method for automatically determining the position of vehicles within such train consist wherein the system and method may be implemented using either componentry dedicated solely to the present invention or a combination of new and existing equipment such as the locomotive computer and the trainlines.

A further objective of the present invention is to provide a system and method for automatically determining the position of vehicles within a train consist wherein a locomotive computer and a vehicle computing device incorporated into each such vehicle communicate over a single trainline to establish the position of all such vehicles within such train consist.

In addition to the objectives and advantages of the present invention set forth above, various other objectives and advantages of the present railroad car position system and method will become more readily apparent to those persons who are skilled in the railroad control equipment art from a reading of the detailed description section of this document. The other objectives and advantages will become particularly apparent when the detailed description is considered along with the accompanying drawings and claims.

DETAILED DESCRIPTION OF THE INVENTION

Figure 1:
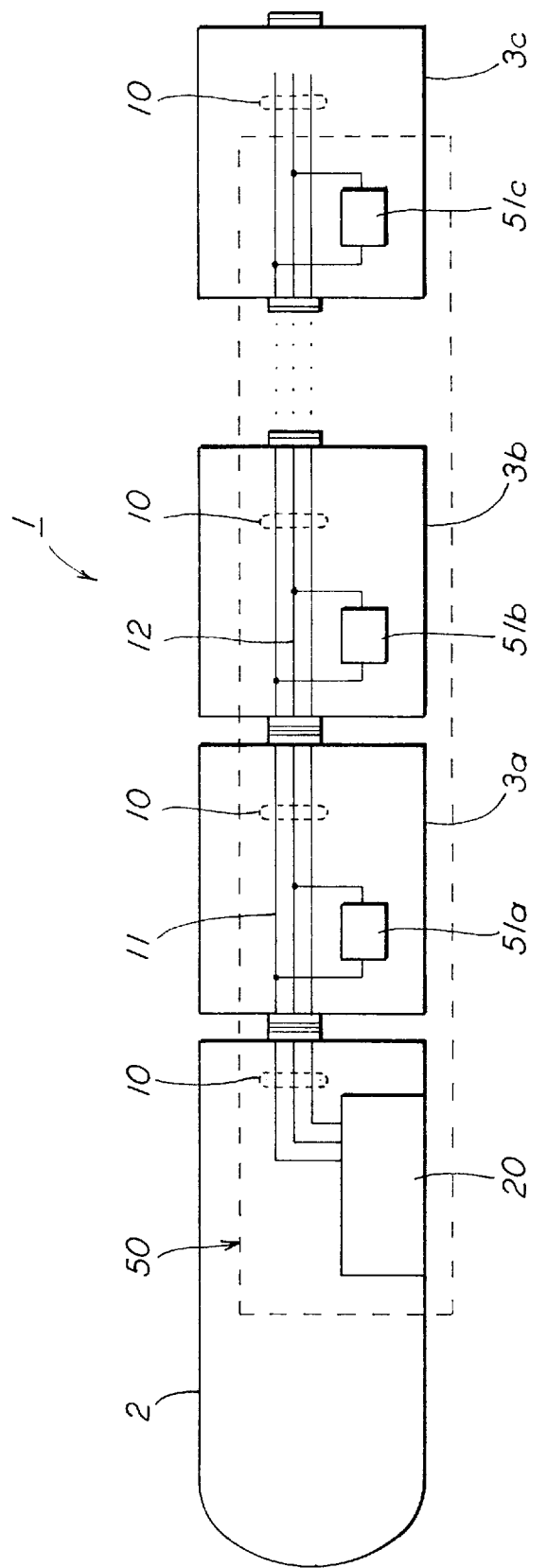
FIG. 1 is a schematic block diagram of a train consist equipped with a system for automatically determining the position of railroad cars within such train consist.

Before presenting a more detailed description of the present railroad car position locating system and method, for the sake of clarity and understanding of the invention, the reader is advised that identical components having identical functions in each of the accompanying drawings have been marked with the same reference numerals in each of the Figures provided in this document.

Figure 2:
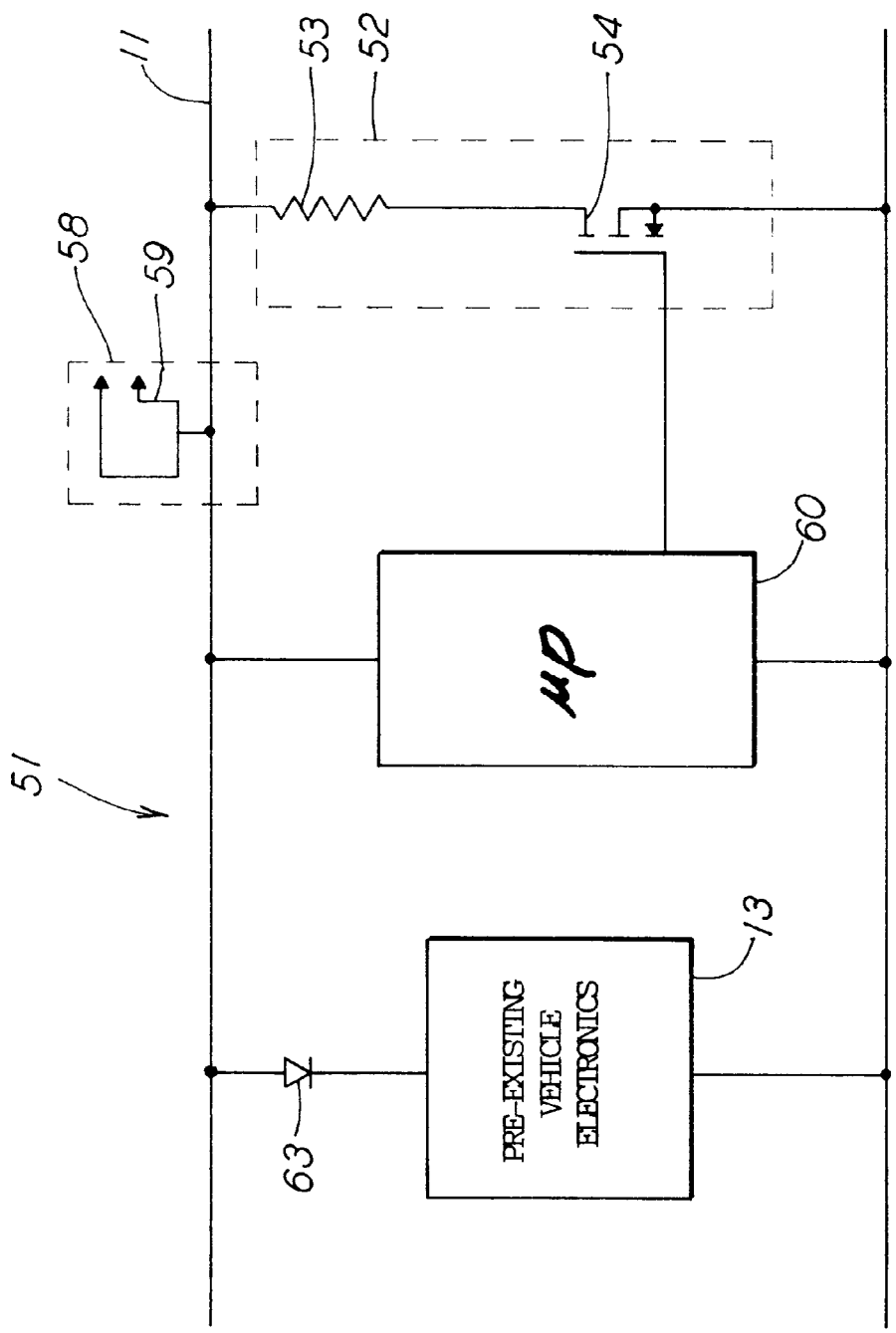
FIG. 2 is a more detailed schematic diagram of the vehicle computing device shown in FIG. 1.

FIGS. 1 and 2 illustrate the essential details of a presently preferred embodiment of the present invention. Specifically, FIG. 1 illustrates a train consist, generally designated 1, equipped with a system, generally designated 50, for automatically determining the position of railroad cars 3 within such train consist 1. The system 50 includes: a computer means 20 operating according to a programming means (not shown) preferably situated within a locomotive 2 of such train consist 1; a vehicle computing means 51 incorporated within each such railroad car 3 and containing a unique identification code; and at least one of a plurality of trainlines 10 interconnecting the computer means 20 with each of the vehicle computing means 51a–51c.

The trainlines 10 of such train consist 1 include a plurality of wires running from such head of train locomotive 2 to a last railroad car 3c in such train consist 1. Examples of such trainlines 10 include, among others, a power line 11 and a return line 12. Each vehicle computing means 51 connects to such power line 11 and a suitable electrical return such as return line 12. Each vehicle computing means 51a–51c can both apply an electrical signal to such power line 11 and sense when another vehicle computing means 51c–51a has applied the electrical signal to such power line 11. Each vehicle computing means 51a–51c is assigned a unique identification code thereby also identifying the particular railroad car in which it is installed.

The computer means 20 of the present invention may take any one of several forms. As computerized systems are standard equipment on many of today's locomotives, a preexisting computerized system such as the WABCO EPIC® Computer Controlled Brake System may serve as the computer means 20 of the present system. Alternatively, a separate computer device dedicated solely to the present invention may serve as the computer means 20. Though space and weight factors among others favor choosing the former alternative, one skilled in the locomotive computer art would have the requisite competence to make and use the present invention no matter which alternative was selected as the computer means 20.

The present railroad car position determining system 50 can be thought of having three phases of operation. The first phase, involving the computer means 20 initially receiving the identification codes from the vehicle computing means 51a–51c, can be referred to as the query phase. The second phase, involving the computer means 20 commanding each of the vehicle computing means 51a–51c to apply the electrical signal to such power line 11, can be referred to as the data collection phase. The third phase, involving the computer means 20 calculating the position of such railroad cars 3 within such train consist 1, can be referred to as the locating phase.

Referring still to FIG. 1, each of vehicle computing means 51a–51c supplies its identification code to the computer means 20 during the query phase of operation. The query phase may occur either automatically or manually. The query phase may occur automatically when power is first applied to both the computer means 20 and the vehicle computing means 51a–51c. For example, each vehicle computing means 51a–51c automatically sends its identification code to the computer means 20 as soon as the railroad car to which it is attached is plugged into the trainlines 10 of the train consist 1. The query phase may also occur manually when a train operator directs the computer means 20 via keyboard or similar input device to query all of the vehicle computing means 51a–51c for their respective identification codes. As such railroad cars 3 are routinely added to and removed from such train consist 1 during train operation, the automatic option is especially useful as it allows such train operator to keep the computer means 20 updated with the most current vehicle computing means/railroad car identification codes. Once the computer means 20 procures all of the identification codes from the vehicle computing means 51a–51c, the computer means 20 is enabled to perform the data collection phase of system operation.

During the data collection phase, the computer means 20 essentially conducts a series of tests to determine automatically the relative positions of each of such railroad cars 3 within such train consist 1. In the most general terms, each test involves the computer means 20 alternately commanding one of, and receiving responses from certain other of, the vehicle computing means 51. Each time the computer means 20 commands one of the vehicle computing means 51 to apply the electrical signal to such power line 11, each of all the other vehicle computing means 51 located between such locomotive 2 and one such railroad car 3 (whose vehicle computing means 51 so applied the electrical signal) senses the electrical signal. Those other vehicle computing means 51 located between such locomotive 2 and one such railroad car 3 then each respond to the computer means 20, via one of such trainlines 10, with an indication that the electrical signal was sensed. The computer means 20, after having commanded all of the vehicle computing means 51 and having received the responses therefrom, automatically determines the position that each such railroad car 3 occupies within such train consist 1.

The query and data collection phases of operation of the present system 50 can perhaps be best explained by the following example which assumes a train consist consisting of four vehicles, i.e., one locomotive and three railroad cars, as illustrated in FIG. 1. When power is first applied to present system 50 or when such train operator so commands via the computer means 20, each of the vehicle computing means 51a–51c provides the computer means 20 with its identification code. From the available identification codes, the computer means 20 then randomly, or according to other criteria, commands one of the vehicle computing means (e.g., 51b) to apply the electrical signal. The vehicle computing means 51b then applies the electrical signal to such power line 11. As the vehicle computing means 51a is the only vehicle computing means located between such locomotive 2 and such railroad car 3b whose vehicle computing means 51b applied the electrical signal to such power line 11, vehicle computing means 51a senses the electrical signal generated by the vehicle computing means 51b. The vehicle computing means 51a then responds to the computer means 20, via one of such trainlines 10, with an indication that the electrical signal was sensed.

Supplied with data evidencing that the vehicle computing means 51a is located forward of the vehicle computing means 5b, the computer means 20 then randomly selects another of the vehicle computing means (e.g., 51a). The vehicle computing means 51a then applies the electrical signal to such power line 11. As there are no vehicle computing means located between such locomotive 2 and such railroad car 3a whose vehicle computing means 51a last applied the electrical signal to such power line 11, the computer means 20 now possesses data evidencing that no railroad cars exist forward of railroad car 3a. The computer means 20 then randomly selects another (and, in this example, the last) of the vehicle computing means (i.e., 51c). The vehicle computing means 51c then applies the electrical signal to such power line 11. As the vehicle computing means 51a and 51b are the only vehicle computing means located between such locomotive 2 and such railroad car 3c whose vehicle computing means 51c last applied the electrical signal to such power line 11, both the vehicle computing means 51a and 51b sense the electrical signal generated by the vehicle computing means 51c. Both the vehicle computing means 51a and 51b then respond to the computer means 20, via one of such trainlines 10, with an indication that the electrical signal was sensed. The computer means 20 now possesses data evidencing that railroad cars 3a and 3b exist forward of railroad car 3c.

Having transmitted all of the available identification codes to the vehicle computing means 51 and having received the expected responses therefrom, the computer means 20 then commences the locating phase of system operation. The computer means 20 processes the data collected from each test to determine automatically the relative positions of each of such railroad car 3 within such train consist 1. Using the data provided by the above example, the first test supplied evidence showing that railroad car 3a is located forward of railroad car 3b. The second test supplied evidence showing that no railroad cars exist forward of railroad car 3a. The third test supplied evidence that railroad cars 3a and 3b exist forward of railroad car 3c. The present system 50, using data gathered in the data collection phase, would then determine in its locating phase that locomotive 2 is followed in order by railroad cars 3a, 3b and 3c.

The vehicle computing means 51 of the present invention 50 may be implemented, among other ways, using a circuit such as that shown in FIG. 2. In this instance, the vehicle computing means 51 includes a means 52 for applying the electrical signal to such power line 11; a means 58 for sensing the electrical signal applied to such power line 11; and a microprocessor 60. The signal sensing means 58 may be implemented using any one of several ways known in the electrical signalling art including a current sensor 59 as shown in FIG. 2. The microprocessor 60 directs the signal applying means 52 to apply the electrical signal to such power line 11 when the microprocessor 60 receives the appropriate command from the computer means 20. The microprocessor 60 also responds to the computer means 20 via such at least one trainline when the signal sensing means 58 senses the electrical signal transmitted by another vehicle computing means 51 that is situated on one of such railroad cars 3 located opposite from both such locomotive 2 and such railroad car 3 on which said signal sensing means 58 is installed.

The signal applying means 52 of the present invention may be implemented, among other ways, using the circuit elements illustrated in FIG. 2. In this circuit design, the signal applying means 52 includes a resistor 53 and a transistor 54 connected in series across such power line 11 and such return line 12. When the microprocessor 60 receives its command from the computer means 20, the microprocessor 60 activates the transistor 54 thereby applying the electrical signal to such power line 11. The transistor 54 may be selected to be a field effect transistor (FET).

As should be apparent to persons skilled in the electrical signalling art, whatever circuit elements are chosen for the signal applying means 52, the electrical signal that it generates should have a signature different from the electrical activity usually found on such power line 11. For example, a distinctive electrical signal, such as a current pulse of magnitude and shape different from the current activity found on such power line 11, may be generated using the resistor 53 and FET transistor 54 arrangement illustrated in FIG. 2.

Likewise, the signal sensing means 58 may be implemented using any one of several ways including a current sensor 59 as shown in FIG. 2. Whatever circuit element(s) are chosen for the signal sensing means 52, it obviously should be able to detect the electrical signal generated by the signal applying means 58.

As should also be apparent to persons skilled in the electrical signalling art, the design of the vehicle computing means circuit permits a vehicle computing means installed on one such railroad car (e.g., 3b) to detect the electrical signal transmitted by another vehicle computing means installed on another such railroad car (e.g., 3c) only when the latter railroad car (e.g., 3c) is located opposite from both such locomotive 2 and the former railroad car (e.g., 3b). In other words, those signal sensing means installed within railroad cars (e.g., 3b and 3c) located rearward of the railroad car (e.g., 3a) whose signal applying means applied the electrical signal to such power line 11 will not receive the electrical signal. The effect of the vehicle computing means circuit design is to provide a signal sensing means that receives electrical signals coming from a rearward end, and not forward end, of such train consist 1.

An optional, though preferred, addition to the present system 50 would be a diode 63 or like suppression element included within the vehicle computing means 51 as shown in FIG. 2. The diode 63 would serve to isolate the present system 50 from unspecified electronic circuitry 13 commonly found on such railroad cars 3 and unrelated to the present invention. Otherwise, such preexisting vehicle electronics 13 may interfere electrically with the electrical signal applied to and sensed on such power line 11 by the present railroad car position determining system 50.

Figure 3:
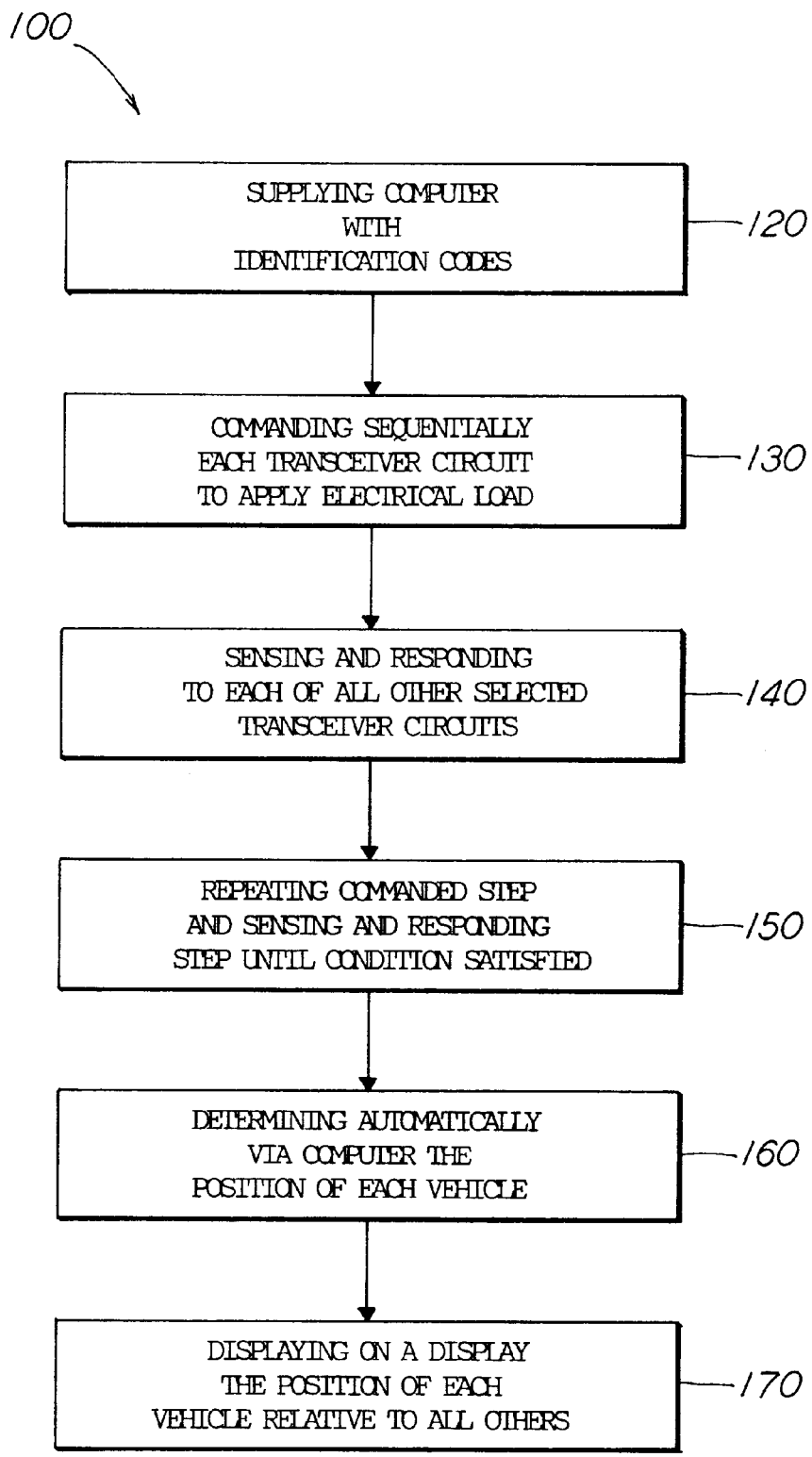
FIG. 3 is a flow chart illustrating the steps of a method for automatically determining the position of railroad cars within such train consist.

Referring now to FIG. 3, illustrated therein in flow chart form are the essential details of a method, generally designated 100, for determining the position of a railroad car within a train consist. Such train consist includes a locomotive, a plurality of trainlines and at least one such railroad car. Such locomotive has a computer means for controlling the operation of the locomotive. Such trainlines include a power line for supplying power to the computer means and to each railroad car, and each railroad car includes a vehicle computing circuit that is assigned a unique identification code. The method 100 includes the steps of supplying 120 the computer means with all of the identification codes assigned to the vehicle computing circuits via at least one trainline; and commanding 130 sequentially, through the computer means, each vehicle computing circuit, via its assigned identification code, to apply an electrical signal to such power line wherein the electrical signal is recognizable by all of the vehicle computing circuits.

The railroad car locating method 100 also includes the step 140 of sensing the electrical signal and responding to the computer means with an indication that the electrical signal was sensed. Specifically, after each vehicle computing circuit has applied the electrical signal to the power line, for each of all other vehicle computing circuits located between the locomotive and the vehicle computing circuit which applied the electrical signal, the electrical signal is sensed. For each of those other vehicle computing circuits so located, the computer means, via at least one trainline, receives a response indicating that the electrical signal was sensed.

The railroad car locating method 100 additionally includes the step of repeating 150, in order, the commanding step 130 and the sensing and responding step 140 until all the vehicle computing circuits have applied the electrical signal to such power line and responded appropriately to the computer means. The method 100 next includes the step of determining 160 automatically via the computer means, using data representing the commands and the responses thereto, the position of each railroad car relative to the positions of all other railroad cars within the train consist.

As such locomotives typically have a cab display for monitoring train operation, the present method 100 may be enhanced by including, after the determining step 160, the step of displaying 170 on such display the position of each railroad car relative to the positions of all other railroad cars within such train consist.

The reader should note that the present system and method need not be limited solely to passenger or freight train consist applications but to any group of interconnected vehicles.

While the presently preferred embodiment and several variations thereon for carrying out the present railroad car position determining system and method have been set forth in detail according to the Patent Act, those persons skilled in the railroad control equipment art to which this invention pertains will recognize various alternative ways of practicing the invention without departing from the spirit and scope of the appended claims.

Accordingly, to promote the progress of science and useful arts, I secure for myself by Letters Patent exclusive rights to all subject matter embraced by the following claims for the time prescribed by the Patent Act.

I claim:

1. A system for determining position of a vehicle within a train consist, such train consist including a locomotive, at least one trainline and at least one such vehicle, such locomotive having a computer for controlling operation of such locomotive, such at least one trainline having a power line for supplying power to such locomotive computer and to such at least one such vehicle within such train consist, said system comprising:

(a) a vehicle computing means, situated on each such vehicle, for applying to and sensing from such power line an electrical signal, each said vehicle computing means having a unique identification code; and (b) a programming means included within such locomotive computer for commanding sequentially each said vehicle computing means, via its assigned said identification code, to apply said electrical signal to such power line;

wherein each time such locomotive computer so commands one of said vehicle computing means, each of all other said vehicle computing means located between such locomotive and said vehicle computing means which applied said electrical signal senses said electrical signal and then responds to such locomotive computer, via such at least one trainline, with an indication that said electrical signal was sensed whereupon such locomotive computer, after having commanded all of said vehicle computing means and having received said responses therefrom, automatically determines such position of each such vehicle relative to such positions of all other such vehicles within such train consist.

2. The system for determining position of a vehicle within a train consist as recited in claim 1 wherein said vehicle computing means includes:

(a) a means for applying said electrical signal to such power line;

(b) a means for sensing said electrical signal applied to such power line; and (c) a microprocessor for directing said signal applying means to apply said electrical signal to such power line upon said command of such locomotive computer and for responding to such locomotive computer, via such at least one trainline, when said signal sensing means senses said electrical signal transmitted by any of said vehicle computing means that are situated on any of such vehicles located opposite from both such locomotive and such vehicle on which said signal sensing means is installed.

3. The system for determining position of a vehicle within a train consist as recited in claim 2 wherein:

(a) such at least one trainline includes a return line for supplying a path for completing electrical circuits supplied by such power line; and (b) said signal applying means includes a resistor and a transistor connected in series across such power line and such return line;

so that when said microprocessor receives its assigned said identification code from such locomotive computer, said microprocessor activates said transistor thereby applying said electrical signal to such power line.

4. The system for determining position of a vehicle within a train consist as recited in claim 3 wherein said transistor is a field effect transistor.

5. The system for determining position of a vehicle within a train consist as recited in claim 2 wherein said signal sensing means includes a current sensor.

6. The system for determining position of a vehicle within a train consist as recited in claim 1 wherein said vehicle computing means further includes a diode connected between such power line and preexisting electronics situated on such vehicle so as to prevent such preexisting electronics from interfering electrically with the operation of said vehicle position determining system.

7. The system for determining position of a vehicle within a train consist as recited in claim 1 wherein said vehicle computing means supplies its said identification code to such locomotive computer automatically when power already applied to such locomotive computer is first applied to said vehicle computing means.

8. The system for determining position of a vehicle within a train consist as recited in claim 1 wherein said vehicle computing means supplies its said identification code to such locomotive computer when a train operator directs such locomotive computer to solicit said vehicle computing means for said identification code.

9. A system for determining position of a vehicle within a train consist, such train consist including a locomotive, at least one trainline and at least one such vehicle, such at least one trainline having a power line for supplying power to such at least one such vehicle within such train consist, said system comprising:

(a) a vehicle computing means, situated on each such vehicle, for applying to and sensing from such power line an electrical signal, each said vehicle computing means having a unique identification code; and (b) a central computer, connected to such power line, for commanding sequentially each said vehicle computing means, via its assigned said identification code, to apply said electrical signal to such power line;

wherein each time said central computer so commands one of said vehicle computing means, each of all other said vehicle computing means located between such locomotive and said vehicle computing means which applied said electrical signal senses said electrical signal and then responds to said central computer, via such at least one trainline, with an indication that said electrical signal was sensed whereupon said central computer, after having commanded all of said vehicle computing means and having received said responses therefrom, automatically determines such position of each such vehicle relative to such positions of all other such vehicles within such train consist.

10. The system for determining position of a vehicle within a train consist as recited in claim 9 wherein said central computer is a locomotive computer for controlling operation of such locomotive and such locomotive computer includes a programming means which enables such locomotive computer both to so command sequentially each said vehicle computing means and to so automatically determine such positions of such vehicles within such train consist from said responses received from said vehicle computing means.

11. The system for determining position of a vehicle within a train consist as recited in claim 9 wherein said vehicle computing means includes:

(a) a means for applying said electrical signal to such power line;

(b) a means for sensing said electrical signal applied to such power line; and (c) a microprocessor for directing said signal applying means to apply said electrical signal to such power line upon said command of said central computer and for responding to said central computer, via such at least one trainline, when said signal sensing means senses said electrical signal transmitted by any of said vehicle computing means that are situated on any of such vehicles located opposite from both such locomotive and such vehicle on which said signal sensing means is installed.

12. The system for determining position of a vehicle within a train consist as recited in claim 11 wherein:

(a) such at least one trainline includes a return line for supplying a path for completing electrical circuits supplied by such power line; and (b) said signal applying means includes a resistor and a transistor connected in series across such power line and said return line;

so that when said microprocessor receives its assigned said identification code from said central computer, said microprocessor activates said transistor thereby applying said electrical signal to such power line.

13. The system for determining position of a vehicle within a train consist as recited in claim 12 wherein said transistor is a field effect transistor.

14. The system for determining position of a vehicle within a train consist as recited in claim 11 wherein said signal sensing means includes a current sensor.

15. The system for determining position of a vehicle within a train consist as recited in claim 9 wherein said vehicle computing means further includes a diode connected between such power line and preexisting electronics situated on such vehicle so as to prevent such preexisting electronics from interfering electrically with the operation of said vehicle position determining system.

16. The system for determining position of a vehicle within a train consist as recited in claim 9 wherein said vehicle computing means supplies its said identification code to said central computer when power already applied to said central computer is first applied to said vehicle computing means.

17. The system for determining position of a vehicle within a train consist as recited in claim 9 wherein said vehicle computing means supplies its said identification code to said central computer when a train operator directs said central computer to solicit said vehicle computing means for said identification code.

18. The system for determining position of a vehicle within a train consist as recited in claim 10 wherein at least one of a dedicated power line and a dedicated return line is used within said system instead of such at least one trainline.

19. A method for determining position of a vehicle within a train consist, such train consist including a locomotive, at least one trainline and at least one such vehicle, such locomotive having a computer for controlling operation of such locomotive, such at least one trainline having a power line for supplying power to said computer and to each such vehicle within such train consist, each such vehicle having a vehicle computing circuit which contains a unique identification code, said method comprising the steps of:

(a) supplying said computer with all of said identification codes assigned to said vehicle computing circuits via such at least one trainline;

(b) commanding sequentially, through said computer, each said vehicle computing circuit, via its assigned said identification code, to apply an electrical signal to such power line wherein said electrical signal is recognizable by all of said vehicle computing circuits;

(c) sensing, for all other said vehicle computing circuits located between such locomotive and said vehicle computing circuit which applied said electrical signal, said electrical signal and responding to said computer via such at least one trainline that said electrical signal was sensed after each said vehicle computing circuit has applied said electrical signal to such power line;

(d) repeating, in order, said commanding step and said sensing and responding step until said computer has so commanded all of said vehicle computing circuits and has received said responses therefrom; and (e) determining automatically via said computer, using data representing said commands and said responses thereto, said position of each such vehicle relative to said positions of all other such vehicles within such train consist.

20. The method for determining position of a vehicle within a train consist as recited in claim 19 wherein such locomotive further includes a display and wherein, after said determining step, said method further includes the step of displaying on such display said position of each such vehicle relative to said positions of all other such vehicles within such train consist.

* * * * *